United States Patent [11] 3,607,806

[72] Inventors John S. Taylor
 Newark, Del.;
 Wilbur T. Brader, Jr., Media, Pa.
[21] Appl. No. 807,066
[22] Filed Mar. 13, 1969
[45] Patented Sept. 21, 1971
[73] Assignee FMC Corporation
 Philadelphia, Pa.

[54] STABLE ORGANIC SOLVENT SOLUTIONS OF CALCIUM STEARATE
 9 Claims, No Drawings
[52] U.S. Cl. .................................................... 260/23 XA,
 106/171, 117/161 UZ, 117/166, 117/167,
 252/363.5, 260/30.4 R, 260/31.2 R, 260/32.8 R,
 260/33.6 UA
[51] Int. Cl. ............................................................. B01f 1/00

[50] Field of Search ............................................ 252/363.5,
 39; 117/167; 260/23 XA; 106/171

[56] References Cited
 UNITED STATES PATENTS
 3,137,666 6/1964 Lox et al. ..................... 260/19
 3,182,020 5/1965 Davis ........................... 252/40.7

Primary Examiner—Donald E. Czaja
Assistant Examiner—Donald J. Barrack
Attorneys—Thomas R. O'Malley, George F. Mueller and Robert G. Hoffmann ABSTRACT: A volatile organic solvent solution of permanently dissolved calcium stearate and a method of preparing the same, are disclosed herein. Such solutions are particularly useful as coating compositions containing film-forming resins.

STABLE ORGANIC SOLVENT SOLUTIONS OF CALCIUM STEARATE

The use of calcium stearate as a mold release agent in plastic moldings is well known. It is also known as an ingredient in lacquer coatings for films. When calcium stearate is introduced in melt form into a volatile organic solvent, such as employed in coating formulations for base sheets or films, the solution remains clear for only a few minutes and then the calcium stearate precipitates. This occurs even when the solvent is maintained at 45° C. When the precipitate is formed, it can not be successfully redissolved in the solvent medium by heating or agitation. Calcium stearate in the form of a precipitate in coating lacquers is particularly undesirable as it tends to increase the haze value of the coating material and the resultant composite film.

It is an object of this invention to provide volatile organic solvent solutions containing permanently dissolved calcium stearate.

It is a further object of this invention to provide improved coating lacquers containing dissolved calcium stearate.

It is still a further object of this invention to provide a method of preparing volatile organic solvent solutions containing dissolved calcium stearate.

These and other objects are accomplished in accordance with this invention which comprises a volatile organic solvent solution containing an additive amount of a dissolved mixture of calcium stearate and an N-acyl sarcosine wherein the acyl group has from 6 to 22 carbon atoms at a mixture ratio of from about 2:1 to about 1:2.

The method of this invention comprises combining an additive amount of a liquid mixture of calcium stearate and an N-acyl sarcosine wherein the acyl group has from 6 to 22 carbon atoms at a mixture ratio ranging from about 2:1 to about 1:2 with a volatile organic solvent.

As previously stated, the composition and method of this invention are particularly useful for coating lacquers, i.e., volatile organic solvent solutions containing dissolved film-forming resins and various additives, which lacquers are applied to clear transparent films and sheets. The resins are generally present in the lacquers in an amount ranging from about 5 to 50 percent, preferably about 10 to 25 percent based on the weight of the lacquer.

Film-forming resins for the lacquer coating of films are well known and principally include vinylidene chloride interpolymers, vinyl chloride polymers and interpolymers, and nitrocellulose.

Additives for such coating compositions include fatty acid amides, e.g. stearamide, waxes, e.g. carnauba wax; fatty acids, e.g. stearic acid; blending agents, e.g. rosin, modified rosins, and polymerized rosins; particulate slip agents, e.g. talc, clays and hard solvent insoluble resins.

Volatile solvents for coating lacquers are also well known and most usually include toluene, tetrahydrofuran, butylacetate, methylethyl ketone, etc., and mixtures thereof.

The foregoing lacquer ingredients and the amounts in which they are used in formulating coating compositions are so well known in the art as to require no further explanation herein.

The N-acyl sarcosines of this invention include the reaction products of sarcosine and fatty acid halides, preferably fatty acid chlorides, wherein the fatty acid has from 6 to 22 carbon atoms. Representatives of these acids are caproic, caprylic, pelargonic, undecylic, lauric, myristic, palmitic, oleic, stearic, elaidic, nonadecylic, arachidic, erucic and behenic acids. Of these reaction products the following are preferred since they are readily available. Lauroyl sarcosine, cocoyl sarcosine, stearoyl sarcosine, and oleyol sarcosine. Such products are available under the trademark Sarkosyl from the Geigy Chemical Corporation. Mixtures of such products will also be useful for the purposes of this invention.

To demonstrate the product and process of this invention, the following examples are set forth.

EXAMPLE I

Two parts of calcium stearate were dissolved in a mixture of 4 parts of candelilla wax and 10 parts of toluene heated to 100° C. The stearate goes into a clear solution. This mixture is incorporated in saran lacquer formulations comprising 15 percent by weight of a resinous copolymer containing about 90 percent vinylidene chloride units dissolved in a 65/35 mixture of tetrahydrofuran and toluene maintained at 45° C. to obtain lacquers containing from about 0.5 to 2 parts calcium stearate per 100 parts of copolymer resin. Within a few minutes the calcium stearate precipitated from the solution. No amount of heating or stirring could successfully redissolve the calcium stearate.

Calcium stearate was also found to dissolve with other lacquer ingredients such as stearamide, carnauba wax, stearic acid and blending resins when the two ingredients were heated together with or without some added toluene. However, in each case, precipitation of the calcium stearate occurred when the hot mixture was added to a 65/35 mixture of tetrahydrofuran and toluene or to a complete coating lacquer.

Calcium stearate also dissolved in toluene, but only at the boiling point, and formed a stiff, transparent gel. Precipitation of the stearate also occurred when this was added to a lacquer.

Several commercially available surfactants were also employed in attempts to prevent the calcium stearate from precipitating from solution. These materials including Atmos 150, Atmos 300 (glycerol fatty acid esters) and pentaerythritol tetrastearate were mixed with the melted mixture of calcium stearate and the mixture stirred into the hot solvent. Within a short time the calcium stearate precipitated.

EXAMPLE II

Equal parts by weight of calcium stearate and lauroyl sarcosine (Sarkosyl L) were melted together both alone and with from 2 to 10 parts of toluene, based on the weight of the lauroyl sarcosine. These melted liquid mixtures were added to solvent mixtures of 65 parts by volume of tetrahydrofuran and 35 parts of toluene at 40°–45° C. with stirring to obtain a concentration of 2.2 percent by weight of calcium stearate in the solutions.

In addition, the melted liquid mixtures were also added to fully formulated saran coating lacquers utilizing solvent mixtures of 65/35 tetrahydrofuran and toluene under the same conditions to obtain a concentration of about 1 part calcium stearate per 100 parts of film-forming resin in the lacquers.

Additionally, the melted liquid mixtures were added to vinyl chloride copolymer lacquers utilizing a 50/50 solvent mixture of butyl acetate and toluene to obtain a concentration of about 1 part calcium stearate per 100 parts of film-forming resins in the lacquer. The ran and vinyl lacquers contained from about 13 to about 22 percent solids.

In each of the above additions the calcium stearate remained in solution at normal lacquer coating temperatures of 40°–45° C. and after 2 days standing at room temperature no precipitation was noted.

Other lacquer additives, e.g. fatty amides, fatty acids, waxes and slip agents, can be advantageously added to the mixture of calcium stearate and N-acyl sarcosine before incorporation into the volatile organic solvent.

The term "solution" as applied herein with respect to dissolved calcium stearate in volatile organic solvents is meant to include both true solutions and optically clear colloidal solutions as opposed to systems in which visible precipitate occurs.

EXAMPLE III

Equal parts of calcium stearate and oleoyl sarcosine (Sarkosyl 0) were mixed together with some toluene (from 14 –21 percent based on the weight of the mixture) to aid in dissolving in the final composition, and the mixture was slowly heated to about 40° C. to dissolve the ingredients. This was combined with hot (40° C. toluene at any concentration to form a clear, stable solution with no precipitation.

Oleoy sarcosine was melted and an equal part of calcium stearate added slowly to it with some toluene. This was also combined with hot toluene as above to produce a clear stable solution without precipitation.

EXAMPLE IV

The same procedures as shown in Example III were carried out using cocoyl sarcosine in place of oleoyl sarcosine with the same excellent results.

EXAMPLE V

Similar results were not obtained with the salts of the N-acyl sarcosines such as sodium lauroyl sarcosine (Sarkosyl NL97) or 1-tyrosine ethyl ester·HCl since these materials will not blend with or dissolve calcium stearate.

Various changes and modifications may be made practicing this invention without departing from the spirit and scope thereof, and therefore, the invention is not to be limited except as defined in the appended claims.

We claim:

1. A volatile organic solvent solution containing a dissolved mixture of calcium stearate and an N-acyl sarcosine wherein the acyl group has from 6 to 22 carbon atoms at a mixture ratio of from about 2:1 to about 1:2.

2. The volatile organic solvent solution of claim 1 wherein the solution contains a film-forming resin selected from the group consisting of vinylidene chloride interpolymers, vinyl chloride homopolymers and interpolymers, and nitrocellulose dissolved therein in an amount of from about 5 to 50 percent based on the weight of the solution.

3. The volatile organic solvent solution of claim 2 wherein said resin is a vinylidene chloride or vinyl chloride interpolymer and the calcium stearate is present in an amount ranging from about 0.5 to about 2 parts per 100 parts by weight of resin.

4. The volatile organic solvent solutuion of claim 3 wherein the N-acyl sarcosine is lauroyl sarcosine.

5. The volatile organic solvent solution of claim 3 wherein the N-acyl sarcosine is oleoyl sarcosine.

6. The volatile organic solvent solution of claim 3 wherein the N-acyl sarcosine is cocoyl sarcosine.

7. A method of preparing a permanent solution of calcium stearate in a volatile organic solvent comprising mixing calcium stearate and an N-acyl sarcosine wherein the acyl group has from 6 to 22 carbon atoms, combining said mixture as a melted liquid at a mixture ratio of from about 1:2 to about 2:1 with a volatile organic solvent.

8. The method of claim 7 wherein from about 2 to about 10 parts of said solvent per part by weight of N-acyl sarcosine is incorporated in said mixture prior to combining the mixture with said solvent.

9. The method of claim 7 wherein the volatile organic solvent contains a dissolved film-forming resin selected from the group consisting of vinylidene chloride interpolymers, vinyl chloride homopolymers and interpolymers, and nitrocellulose in an amount of from about 5 to 50 percent based on the weight of the solution and the melted liquid mixture is combined with the solvent in an amount wherein the calcium stearate is present in an amount ranging from about 0.5 to about 2.0 parts per 100 parts by weight of said resin.